Figure 1:
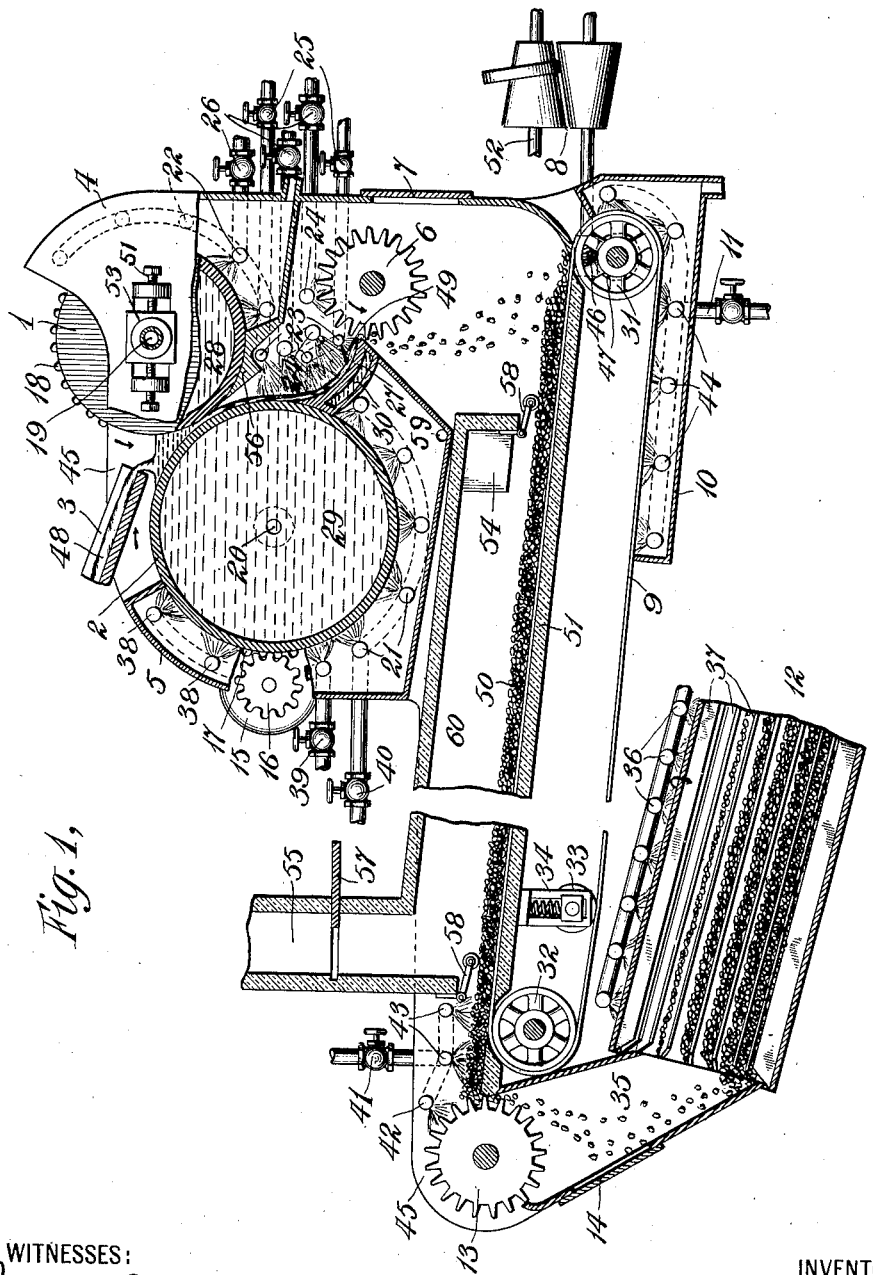

H. L. DUNCAN.
APPARATUS FOR MAKING CEMENT.
APPLICATION FILED JUNE 20, 1910.

1,113,933.

Patented Oct. 13, 1914.
2 SHEETS—SHEET 1.

WITNESSES:
Jessie B. Kay
Albert C. Thayer

INVENTOR
Harry L. Duncan
BY
Duncan & Duncan ATTORNEYS

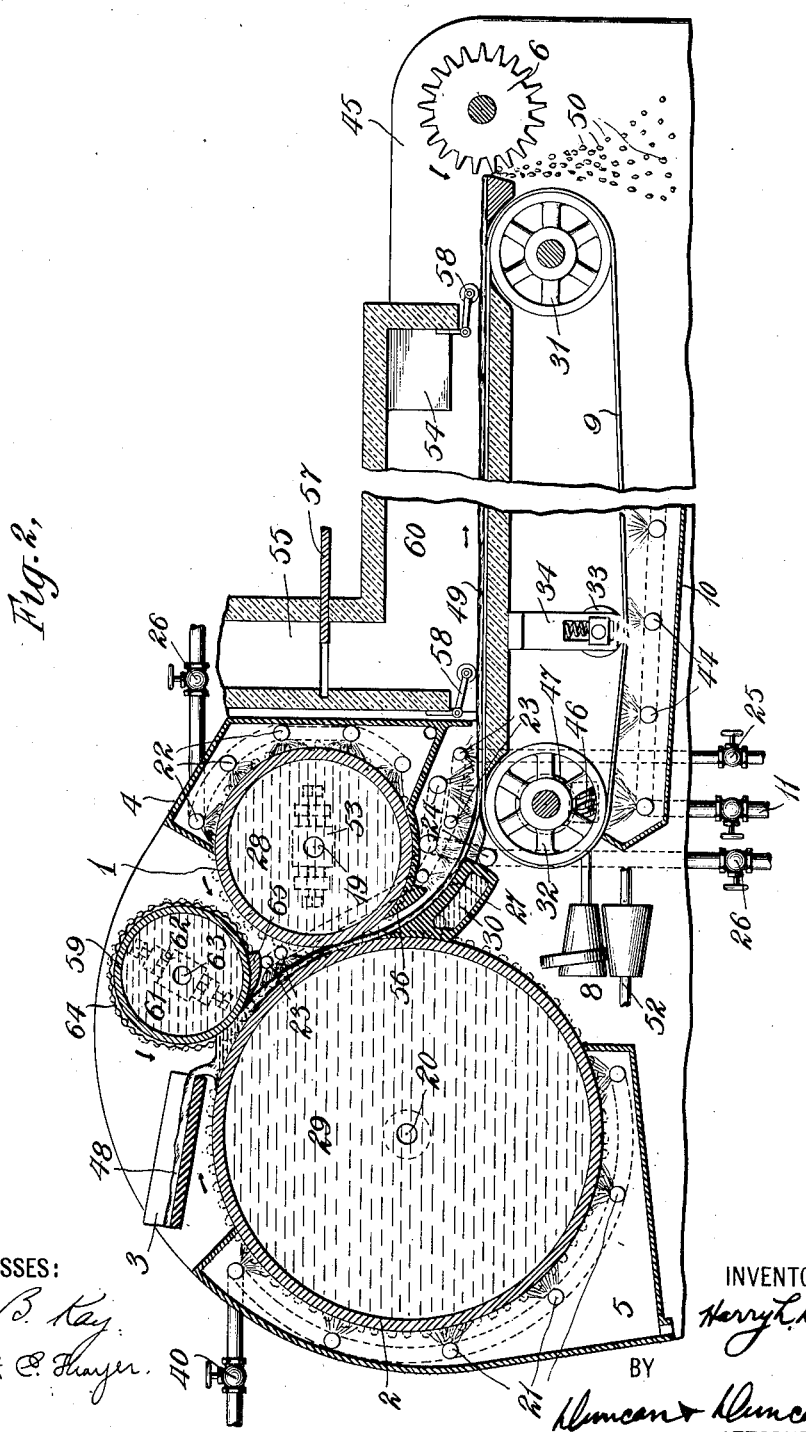

UNITED STATES PATENT OFFICE.

HARRY L. DUNCAN, OF NEW YORK, N. Y.

APPARATUS FOR MAKING CEMENT.

1,113,933.  Specification of Letters Patent.  Patented Oct. 13, 1914.

Continuation of application Serial No. 180,996, filed November 13, 1903. This application filed June 20, 1910. Serial No. 567,784.

*To all whom it may concern:*

Be it known that I, HARRY L. DUNCAN, a citizen of the United States, and resident of New York city, in the borough of Brooklyn, county of Kings, and State of New York, have invented certain new and useful Improvements in Apparatus for Making Cement, of which the following is a specification, taken in connection with the accompanying drawings, which form a part of the same.

This invention relates to apparatus for the manufacture of slag cement in which it is not necessary to incorporate or add hydrated lime.

Blast furnace slag which is the waste product from iron furnaces may be used or slag may be specially smelted for use in this apparatus, if desired. The basic blast furnace slag, such as is produced as a by-product in the manufacture of gray pig iron, seems to be best adapted for this use and this high limed slag, preferably contains 45 to 50 per cent. of lime and not more than 35 per cent. of silica. Basic slag of this description when allowed to cool in large masses in air sometimes decrepitates spontaneously into an impalpable powder.

Basic blast furnace slag may be treated so as to convert the same into material containing considerable proportions of active slag cement material. Usually in the commercial operation this active cement material is not formed in an absolutely pure state, although when water granulated furnace slag is roasted up to a plastic condition which usually corresponds with a temperature of about 1200° centigrade and then quickly cooled a comparatively pure active cement material is formed. This active material does not decrepitate in air and it seems to have a crystalline structure as is evidenced by the fact that it polarizes light. The annealing process to which the slag has been subjected in forming active cement material as herein described and by which the slag is maintained in the annealing or plastic temperature for a considerable length of time seems to affect a rearrangement of the molecular structure of the slag and a formation of compounds different from those occurring in water granulated slag. When active slag cement material is finely ground, slightly moistened, compressed into a cake and subjected to carbon-dioxid, a very considerable rise of temperature takes place, the compressed cake of active material showing a rise of 40° or so centigrade in an atmosphere of pure carbon-dioxid. Inert slag cement material may also be formed from blast furnace slag and this inert material is found in a comparatively pure condition in water-granulated slag dried at 200° centigrade. This inert material does not decrepitate in air and seems to have a glassy or non-crystalline structure as indicated by the fact that it does not polarize light. This inert material when finely ground, moistened, compressed into a cake and treated with carbon-dioxid only gives an inconsiderable rise of temperature as compared with that produced with active cement material.

Inert material, such as chilled slag, or such as dried water granulated slag when mixed in a finely powdered condition with about equal parts of active cement material, such as annealed molten furnace slag or roasted water granulated slag produces a valuable highly cementitious material. The setting time of this cementitious mixture may, however, be regulated and its properties improved to some extent by an admixture of about ten per cent. of ordinary Portland cement and also in some cases, if desired, by a further admixture of calcium sulfate to the extent of a few per cent.

In the accompanying drawings in which the same reference numeral refers to similar parts in the several figures, Figure 1 is an elevation partly in section of an illustrative apparatus. Fig. 2 is a similar partial elevation of a modified construction of apparatus.

A moving congealing surface may be used in this apparatus to congeal substantially molten furnace slag into a consistent stream for treatment. In the drawings, a congealing roll 2 which should have a diameter of three or four feet or so is indicated for this purpose. This roll is preferably provided with a water space 29 so that the congealing surface is kept at the proper temperature by a circulation of water or other fluid, each of the trunnions being formed with an aperture 20 to secure this circulation. This roll which may be used with a coöperating congealing surface of any description is indicated as being formed with the gear 17 in engagement with the pinion 16 secured to an electric motor 15 or other adjustable speed driving device by which the speed of rotation of the congealing roll may be varied to suit the requirements of the operation.

The coöperating congealing roll 1 is indicated as being formed with a similar water space 28, each of the trunnions of this roll being formed with a suitable aperture 19 to secure the circulation of the proper cooling fluid. This roll is preferably provided with the gear 18 which may mesh with the gear 17 on the roll 2 so as to rotate these coöperating rolls in unison or the roll 1 may be positively rotated in any other desired way. The roll 1 is adjustable with respect to the other congealing roll so as to vary the distance between them, the trunnion block 53 of the roll 1 being mounted in a slot and adjusted by heavy screws 51, as indicated. Besides the internal cooling means described, additional external cooling means may be employed, if desired. The cooling chamber 4 may be formed partially inclosing the roll 1, the upper end of the chamber being preferably closely adjacent the roll in the form of a scraper to remove surplus cooling fluid. A number of spray pipes 22 are indicated within the chamber to furnish sprays of cooling fluid, such as water, to the roll, so that the heat of the roll is rapidly dissipated and removed from the exterior portions of the congealing surface. The chilling surface is thereby more quickly cooled than if all the heat were conducted inward to be absorbed by the internal water jacket. The amount of cooling fluids supplied through the spray pipes 22 is regulated by a suitable valve 26 in the supply pipe. A similar cooling chamber 5 is formed around the coöperating roll 2 and a number of spray pipes 38 are shown coöperating with the upper part of the roll within the chamber furnished with the desired amount of cooling fluid by the valve 39 in the supply pipe. Another series of spray pipes 21 coöperate with the lower portion of this roll and the amount of fluid which they furnish is regulated by the valve 40 in the supply pipe with which they are connected. The surplus cooling fluid is removed from the chamber through the aperture 59 at the bottom.

The scraper 56 is mounted adjacent the congealing roll 1 and disengages the congealed consistent stream from this roll and this stream 49 moves down the opposite surface of the congealing roll 2 and is disengaged therefrom by the upper scraping edge of the stationary conveyer 27. This conveyer is preferably formed with a suitable jacket 30 within which water, steam or other fluid may be maintained to regulate the temperature of this conveyer. The consistent slag stream 49 may move directly from the stationary conveyer upon a suitable moving conveyer 9, as indicated in Fig. 2 and this moving conveyer which may be in the form of a belt 9 of metal or other suitable material, is of any desired length and should be long enough so that with the speed used the desired annealing action takes place. This conveyer may, if desired, be inclosed in a suitable annealing chamber 60 indicated in Fig. 2 and suitable heating means, such as the heat supply flue 54 supplying heated gases which may pass out through the discharge flue 55 to the extent governed by the control valve 57, may be used, if desired, to maintain the slag on the moving conveyer in the plastic annealing condition, preferably for a couple of minutes or so. Suitable gates 58 provided with rolls to engage the slag material may be mounted at either end of the annealing chamber to prevent the escape of heat at these points. If desired, however, a suitable breaker may be used to break up the consistent stream 49 and this breaker 6 may take the form of a rapidly rotating toothed wheel indicated in Fig. 1 where it is shown mounted to rotate adjacent the end of the conveyer or guide 27. The pieces of slag are thus piled up on the moving conveyer 9 below, which is shown as passing over the guide 51 and mounted upon the drums 31, 32 spaced apart at a suitable distance. A spring-pressed tightening roll 33 may be used in connection with this conveyer, this roll being shown as mounted in the slotted frame 34. The drum 31 is rotated at the speed desired by any means and may be rotated by a suitable worm wheel 47 secured to the drum and engaged by the coöperating worm 46. This worm may be driven through the cone pulleys 8 from the driving shaft 52 and the rate of movement of the conveyer 9 may be thus regulated so that the material 50 on the conveyer is kept in the annealing condition for the time desired, preferably a couple of minutes or more. A suitable cooling chamber may be used adjacent the lower end of the conveyer 9, a number of spray pipes 44 being mounted in this chamber and supplied with the desired amount of cooling fluid by the valved supply pipe 11, the surplus water draining out of the chamber as indicated.

A number of treating jets may be mounted adjacent the stationary conveyer to operate upon the slag material thereon. The jet pipes 23 extending parallel to the congealing rolls and which may be provided with a number of apertures along their length for the discharge of fluid are mounted adjacent the conveyer 27 so as to supply jets of treating fluid, such as steam, air, gas or water to the slag. The fluid supplied to the upper jet pipe is controlled by the valve 25 and the fluid supplied to the two lower jet pipes 23 is controlled by a similar separate valve, as indicated. Other jet pipes 24 are indicated by which other treating fluid, such as water, steam, air or gas may be supplied, the amount of fluid issuing from the apertures in these jet pipes being controlled by the valve 26. Also, if desired, a similar perforated jet pipe 24 may be mounted adjacent the breaker 6 and may be furnished with fluid, preferably water or steam, the amount of which is controlled by the valve 26. This fluid assists in rendering the breaker self-clearing, the high speed of the breaker and the treating fluid sprayed upon it preventing the slag from sticking to it to an undesirable extent. Other jet pipes 42, 43 are indicated adjacent the moving conveyer and the amount of treating fluid supplied to these perforated pipes is regulated by the valve 41. It is, of course, understood that other jet pipes may be used at other portions of the conveyer if desired.

A suitable pulverizer is mounted adjacent the conveyer and the pulverizer may take the form of the heavy toothed wheel 13 rotated by suitable means adjacent the end of the conveyer. This wheel pulverizes the material which falls down a suitable chute 35 to be cooled and removed. The rotary cooler 12 may be mounted to receive these particles of slag, the cooler being preferably rotated by any desired means and formed with the internally projecting ribs 37 to agitate the material and to rapidly cool the same in connection with the spray pipes 30 which furnish sprays of cooling fluid to the outside of the cooler.

If desired, a suitable feed roll may be employed to positively feed the proper quantity of material to the congealing rolls. In Fig. 2 the feed roll 59 is indicated as being provided with water space 61 each of the trunnions 62 being formed with a suitable aperture 63 by which cooling fluid may be supplied to the interior of the roll. The outside of this feed roll is preferably formed with suitable corrugations 64 and also with annular grooves with which a suitable scraper 65 coacts to disengage the material from the roll. This feed roll may be rotated in the direction indicated by any desired means and its trunnions are preferably adjustable with respect to the congealing roll 2 with which it coöperates. The substantially molten slag 48 is supplied to the feeding roll by a number of spouts, 3 located as shown in the drawing. It is not necessary, however, in all cases to employ the separate feeding roll described, since the positive feeding forward of the material may be affected by slightly roughening the surfaces of the congealing rolls themselves, if desired. The substantially molten slag may be supplied to the bite of the congealing rolls by a number of slag spouts, such as 3, each of which, as indicated in Fig. 1, supplies a stream 48 of slag. The frame 45 of this apparatus coöperates with the congealing rolls and constitutes the sides of a slag trough which directs the substantially molten slag between the congealing rolls. This frame is continued around the conveyer and may be provided with suitable doors, such as 7 and 14 for inspection or for the circulation of air or treating fluids through the apparatus.

Slag material containing considerable proportions of active cement material may be produced on the apparatus described. The congealing rolls are preferably adjusted so that the consistent stream of slag material is plastic when it issues from the bite of the rolls and preferably about a quarter of an inch thick. This stream, which may be treated with fluid on the conveyer, preferably with air or steam, should be in the plastic condition while it is upon the moving conveyer and if the breaker is used the speed of the various parts of the apparatus should be so adjusted that the slag is piled up on the moving conveyer so that the dissipation of heat is prevented and the slag annealed by its own heat. This amount of slag 50 is thus annealed on the conveyer and the conveyer should be of such length and driven at such speed that the annealing action lasts for several minutes to secure the best results. If desired, however, a suitable substantially inclosed annealing chamber 60 may be formed above the conveyer and this chamber may be supplied, if desired, with heated gases to insure the proper annealing of the slag before it is disintegrated into particles 50 by the breaker or disintegrator 6 as is indicated on Fig. 2. This annealing process should not continue so long, however, that decrepitation of the slag is effected and after annealing sufficiently the slag should be quickly cooled for this same reason. If an annealing chamber is employed in connection with the conveyer the temperature of the chamber should be so adjusted that the slag is properly annealed by being kept substantially in the plastic condition. Inert slag cement material may be made on this same apparatus, the congealing rolls for this purpose being preferably adjusted considerably closer together and if desired, also they may be rotated somewhat faster. In this way, the stream of slag may be congealed more thoroughly and may be chilled to a substantially rigid condition when issuing from the congealing rolls. In passing over the conveyer, this slag may be treated with suitable fluids and, indeed, jets of cooling liquid, such as water, may be freely used, since after the slag has been cooled to a certain extent the contact of water does not have a bad effect, the water not being absorbed as is the case when the molten slag is run directly into water. In producing inert cement material therefore, the congealing rolls may be set as close together as about a sixteenth or an eighth of an inch, the resulting stream of consistent material being treated first by steam or air if desired, and then by water jets to rapidly chill and cool the same, the material being subsequently broken up for more convenient further treatment, it being of course unnecessary in such case to provide or operate the annealing chamber in connection with the conveyer. The materials thus produced are preferably finely pulverized and mixed together in such proportions that the mixture contains about equal parts of active cement material and inert cement material, although considerable variations may be made from these proportions. An admixture of about ten per cent. of Portland cement may be made to the mixed slag product and a further admixture of one or two per cent. of calcium sulfate may be used to improve the setting properties of the cementitious material formed. If the material produced by this process which contains the active cement material is not entirely pure, a suitable allowance may be made for this fact in mixing the two kinds of treated slag. Indeed, in some instances, the apparatus may be so operated that parts of the slag are rapidly chilled to form inert cement material and other portions are suitably annealed to form a material containing considerable proportions of active material. In this way, the resulting slag product may contain without further admixture the proper proportions of active and inert cement materials.

The invention has been described in this case which is a continuation, that is, which contains subject-matter taken from the earlier process application 180,996, filed November 13, 1903 in connection with a number of illustrative embodiments, proportions, arrangements and devices to the details of which disclosure the invention is not of course to be limited.

What is claimed is:

1. In cement apparatus, a pair of congealing rolls, means to adjust the distance between said rolls, means to circulate cooling fluids through the interior of said rolls, cooling chambers arranged adjacent said congealing rolls and means to supply fluid cooling jets to the portions of said rolls within said chambers, a corrugated cooled feed roll provided with a disengaging scraper coöperating with the larger of said congealing rolls, means to supply substantially molten furnace slag to said larger congealing roll adjacent said feed roll to be thereby fed in regulated quantities between said congealing rolls and converted into a consistent plastic slag stream, a stationary cooled conveyer coöperating with said larger congealing roll to disengage the slag stream therefrom and guide the same over said conveyer, a rotating breaker coöperating with said conveyer to disintegrate said slag stream into plastic particles, means to direct gaseous and liquid cooling jets upon said breaker and said slag stream on said conveyer, a moving conveyer to receive the said slag particles, adjustable speed devices to operate said conveyer, a substantially inclosed annealing chamber and heating means coöperating with said moving conveyer, fluid cooling jets arranged adjacent the discharge end of said conveyer, a rotating disintegrator coöperating with said conveyer to disintegrate the slag material delivered therefrom and a chute and a rotating ribbed cooling cylinder to receive and cool said disintegrated slag particles to form active slag cement material.

2. In cement apparatus, a pair of congealing rolls, means to adjust the distance between said rolls, means to circulate cooling fluid through said rolls, a feed roll coöperating with one of said congealing rolls, means to supply substantially molten furnace slag adjacent said feed roll to be thereby fed in regulated quantities between said congealing rolls and converted into a consistent plastic slag stream, a stationary conveyer coöperating with said rolls to receive the slag stream therefrom, a rotating breaker coöperating with said conveyer to disintegrate said slag stream into plastic particles, a moving conveyer to receive said slag particles, an annealing chamber coöperating with said moving conveyer and disintegrating and cooling means coöperating with said moving conveyer to receive and cool the disintegrating slag particles and form active slag cement material.

3. In cement apparatus, a coöperating pair of congealing rolls, means to supply cooling fluid to said rolls, means to feed highly heated furnace slag to said rolls, to be thereby converted into a consistent plastic slag stream, a breaker coöperating with said rolls to disintegrate said slag stream into particles, a conveyer to receive said slag particles, means to anneal said slag particles on said conveyer and cooling means to receive and cool the slag particles from said conveyer.

4. In cement apparatus, a pair of congealing rolls, means to supply cooling fluid to said rolls, means to supply highly heated furnace slag to said rolls to be converted into a consistent plastic slag stream, a conveyer coöperating with said rolls, annealing means coöperating with said conveyer to anneal the slag material therefrom and cooling means to receive and cool the slag material from said conveyer.

5. In cement apparatus, means to form from substantially molten furnace slag a substantially consistent plastic slag stream, a conveyer, means to disintegrate said slag stream into particles and deliver the same to said conveyer, means to anneal said slag material on said conveyer and cooling means to receive and cool the slag material from said conveyer and form active slag cement material.

6. In cement apparatus, a pair of congealing rolls, means to supply cooling fluid to said rolls, means to supply highly heated furnace slag to said rolls to be converted into a consistent plastic slag stream, a conveyer coöperating with said rolls, and annealing means coöperating with said conveyer to anneal the slag material thereon.

7. In cement apparatus, means to form from substantially molten furnace slag a substantially consistent plastic slag stream, a conveyer, means to disintegrate said slag stream into particles and deliver the same to said conveyer and means to anneal said slag material on said conveyer.

8. In cement apparatus, means to deliver substantially plastic slag material, a conveyer to receive said slag material, means to anneal said slag material and disintegrating and cooling means coöperating with said conveyer to receive the slag material therefrom.

9. In cement apparatus, means to deliver substantially plastic slag material, conveyer means to receive said slag material, annealing means coöperating with said conveyer and cooling means to receive the slag material from said conveyer.

10. In cement apparatus, means to deliver substantially plastic slag material, a conveyer, disintegrating means to disintegrate said slag material into particles and deliver the same to said conveyer to anneal said slag material and form active slag cement material therefrom.

11. In cement apparatus, a conveyer, and means to supply substantially plastic disintegrated slag material to said conveyer and pile the same thereon to anneal said slag material and form active slag cement material.

12. In cement apparatus, means to form a substantially consistent stream of plastic slag material, cooling means to supply aqueous cooling jets to said stream, a conveyer and means to disintegrate said slag material and pile the same on said conveyer to anneal said slag material and form active slag cement material.

13. In cement apparatus, a conveyer, means to supply substantially plastic disintegrated slag material to said conveyer and pile the same thereon and means to move said conveyer at regulated speed to anneal said slag material for a predetermined time and form active slag cement material.

14. I cement apparatus, a coöperating pair of congealing rolls, means to feed highly heated furnace slag to said rolls to be thereby converted into a consistent plastic slag stream, a breaker coöperating with said rolls to disintegrate said slag stream into small highly heated particles, a conveyer to receive said slag particles, means to anneal said slag particles on said conveyer and rotating agitating cooling means to receive and cool the slag particles from said conveyer.

15. In cement apparatus, a cooperating pair of congealing rolls, means to feed highly heated furnace slag to said rolls to be thereby converted into a consistent plastic slag stream, a breaker coöperating with said rolls to disintegrate said slag stream into heated particles, a conveyer to receive said slag particles, means to anneal said slag particles on said conveyer and agitating cooling means to receive and cool the slag particles from said conveyer.

16. In cement apparatus, means to convert highly heated furnace slag into a consistent plastic slag stream, a breaker coöperating with said rolls to disintegrate said slag stream into heated particles, a conveyer to receive said slag particles, means to anneal said slag particles on said conveyer.

17. In cement apparatus, a coöperating pair of congealing rolls, means to feed highly heated furnace slag to said rolls, to be thereby converted into a consistent plastic heated condition, a breaker coöperating with said rolls to disintegrate said plastic slag into small highly heated particles, a conveyer to receive and anneal said slag particles on said conveyer and rotating cooling means to receive and cool the slag particles from said conveyer.

18. In cement apparatus, a coöperating pair of congealing rolls, means to feed highly heated furnace slag to said rolls, to be thereby converted into a consistent plastic heated condition, a breaker coöperating with said rolls to disintegrate said plastic slag into heated particles and a conveyer to receive and anneal said slag particles on said conveyer.

19. In cement apparatus, means to form a substantially consistent body of plastic slag material, cooling means to supply aqueous cooling jets to said stream, a conveyer and means to disintegrate said slag material into heated plastic particles and pile the same on said conveyer in a thick layer to anneal said slag material and form active slag cement material.

20. In cement apparatus, means to form a substantially consistent body of plastic slag material, a conveyer and means to disintegrate said slag material into heated plastic particles and pile the same on said conveyer to anneal said slag material and form active slag cement material.

21. In cement apparatus, means to form a substantially consistent mass of plastic slag material, an adjustable conveyer and means to disintegrate said slag material into heated plastic particles and pile the same on said conveyer in a substantially uniform thick layer to anneal said slag material for a predetermined time and form active slag cement material.

22. In cement apparatus, means to form a substantially consistent mass of plastic slag material, a conveyer and means to disintegrate said slag material into heated plastic particles and pile the same on said conveyer in a substantially uniform thick layer to anneal said slag material and form active slag cement material.

HARRY L. DUNCAN.

Witnesses:
   JESSIE B. KAY,
   ALBERT E. THAYER.